United States Patent
Shi et al.

(10) Patent No.: US 10,972,870 B2
(45) Date of Patent: Apr. 6, 2021

(54) DOWNLINK DATA TRANSMISSION METHOD AND APPARATUS

(71) Applicant: HUAWEI TECHNOLOGIES CO., LTD., Guangdong (CN)

(72) Inventors: Xiaoyan Shi, Shenzhen (CN); Qianghua Zhu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/524,443

(22) Filed: Jul. 29, 2019

(65) Prior Publication Data

US 2019/0349717 A1    Nov. 14, 2019

Related U.S. Application Data

(63) Continuation of application No. PCT/CN2017/073458, filed on Feb. 14, 2017.

(51) Int. Cl.
    *H04W 4/029* (2018.01)
    *H04W 76/25* (2018.01)
    (Continued)

(52) U.S. Cl.
    CPC .......... *H04W 4/029* (2018.02); *H04W 8/08* (2013.01); *H04W 68/005* (2013.01); *H04W 76/11* (2018.02); *H04W 76/25* (2018.02)

(58) Field of Classification Search
    CPC ..... H04W 4/029; H04W 76/25; H04W 76/11; H04W 8/08; H04W 68/005
    See application file for complete search history.

(56) References Cited

U.S. PATENT DOCUMENTS

2006/0140159 A1   6/2006  Choi et al.
2009/0318147 A1*  12/2009 Zhang ................... H04L 61/106
                                                    455/435.1

(Continued)

FOREIGN PATENT DOCUMENTS

CN         1499760 A      5/2004
CN       101242206 A      8/2008

(Continued)

OTHER PUBLICATIONS

3GPP TS 23.401 V14.2.0 (Dec. 2016), 3rd Generation Partnership Project;Technical Specification Group Services and System Aspects;General Packet Radio Service (GPRS) enhancements for Evolved Universal Terrestrial Radio Access Network (E-UTRAN) access(Release 14), Dec. 2016. total 385 pages.

(Continued)

*Primary Examiner* — Jael M Ulysse
(74) *Attorney, Agent, or Firm* — Womble Bond Dickinson (US) LLP

(57) ABSTRACT

Embodiments of this application provide a downlink data transmission method and apparatus. The method includes: receiving, by a user plane device, downlink data of a terminal, sending, by the user plane device, the downlink data by using a shared bearer to an access network device that is in a tracking area of the terminal, receiving, by the access network device, a context setup request message sent by a control plane device, setting up, by the access network device, a radio bearer between the access network device and the terminal based on the context setup request message, and sending, by the access network device, the downlink data to the terminal by using the radio bearer. In this way, a downlink data transmission delay is reduced and downlink data transmission efficiency is improved.

17 Claims, 9 Drawing Sheets

(51) Int. Cl.
  *H04W 76/11* (2018.01)
  *H04W 8/08* (2009.01)
  *H04W 68/00* (2009.01)

(56) References Cited

U.S. PATENT DOCUMENTS

| | | | | |
|---|---|---|---|---|
| 2010/0020812 | A1* | 1/2010 | Nakamura | H04W 8/082 |
| | | | | 370/401 |
| 2010/0195621 | A1* | 8/2010 | Kekki | H04W 48/17 |
| | | | | 370/332 |
| 2011/0110379 | A1 | 5/2011 | Lim et al. | |
| 2013/0039287 | A1* | 2/2013 | Rayavarapu | H04W 76/28 |
| | | | | 370/329 |
| 2013/0039339 | A1* | 2/2013 | Rayavarapu | H04W 76/19 |
| | | | | 370/331 |
| 2013/0301611 | A1* | 11/2013 | Baghel | H04W 76/12 |
| | | | | 370/331 |
| 2014/0003357 | A1* | 1/2014 | Ejzak | H04W 76/12 |
| | | | | 370/329 |
| 2014/0079049 | A1* | 3/2014 | Friman | H04L 63/306 |
| | | | | 370/338 |
| 2014/0126489 | A1* | 5/2014 | Zakrzewski | H04W 72/1289 |
| | | | | 370/329 |
| 2014/0198637 | A1* | 7/2014 | Shan | H04W 52/244 |
| | | | | 370/229 |
| 2015/0016347 | A1* | 1/2015 | Barclay | H04W 40/02 |
| | | | | 370/329 |
| 2015/0085778 | A1 | 3/2015 | Morioka | |
| 2015/0085803 | A1 | 3/2015 | Hu et al. | |
| 2015/0085845 | A1* | 3/2015 | Wang | H04W 76/12 |
| | | | | 370/338 |
| 2015/0110095 | A1* | 4/2015 | Tan | H04L 61/2007 |
| | | | | 370/338 |
| 2015/0173121 | A1* | 6/2015 | Miklos | H04W 68/00 |
| | | | | 370/329 |
| 2015/0223196 | A1* | 8/2015 | Kim | H04W 76/11 |
| | | | | 455/458 |
| 2016/0105838 | A1* | 4/2016 | Wang | H04W 40/04 |
| | | | | 370/329 |
| 2016/0112896 | A1* | 4/2016 | Karampatsis | H04W 28/0289 |
| | | | | 370/230.1 |
| 2016/0135166 | A1* | 5/2016 | Cilli | H04W 8/10 |
| | | | | 370/329 |
| 2016/0219495 | A1 | 7/2016 | Martin et al. | |
| 2016/0286597 | A1* | 9/2016 | Eriksson | H04L 61/2007 |
| 2016/0309379 | A1* | 10/2016 | Pelletier | H04W 76/12 |
| 2016/0323845 | A1* | 11/2016 | Kim | H04W 88/16 |
| 2016/0338130 | A1* | 11/2016 | Park | H04W 76/15 |
| 2018/0206275 | A1* | 7/2018 | Jain | H04W 76/11 |

FOREIGN PATENT DOCUMENTS

| | | |
|---|---|---|
| CN | 102076028 A | 5/2011 |
| CN | 103458386 A | 12/2013 |
| CN | 103563440 A | 2/2014 |
| EP | 2773139 | 9/2014 |
| EP | 2858390 A1 | 4/2015 |
| GB | 2343594 A | 5/2000 |
| WO | 2007068266 A1 | 6/2007 |
| WO | 2012126761 A1 | 9/2012 |

OTHER PUBLICATIONS

ZTE et al. Discussion on how PCRF requests PCEF t o share the resources for a set of PCC rules, SA WG2 Meeting S2#104, S2-142617, Location, Country, Jul. 7-11, 2014, total 3 pages.

Nokia et al.,"MME report for set of PRA",3GPP TSG-SA2 Meeting #118 S2-166515,Nov. 14-18, 2016, Reno, Nevada, USA,total 27 pages.

Huawei et al.,"Support of Multiple PRAs",SA WG2 Meeting #115 S2-162698,May 23-27, 2016, Nanjing, P.R. China, total 14 pages.

Chengchao Liang et al.,"Wireless Network Virtualization: A Survey, Some Research Issues and Challenges",IEEE Communication Surveys and Tutorials, vol. 17, No. 1, First Quarter 2015,total 23 pages.

3GPP TR 25.912 V11.0.0 (2012-09);3rd Generation Partnership Project;Technical Specification Group Radio Access Network;Feasibility study for evolved Universal Terrestrial Radio Access (UTRA) and Universal Terrestrial Radio Access Network (UTRAN) (Release 11);total 64 pages.

* cited by examiner

DOWNLINK DATA TRANSMISSION METHOD AND APPARATUS

CROSS-REFERENCE TO RELATED APPLICATIONS

This application is a continuation of International Application No. PCT/CN2017/073458, filed on Feb. 14, 2017, the disclosure of which is hereby incorporated by reference in its entirety.

TECHNICAL FIELD

This application relates to the field of communications technologies, and in particular, to a downlink data transmission method and apparatus.

BACKGROUND

Generally, when a terminal in an idle mode needs to transmit data to a network side device, a service request procedure triggered by the terminal needs to be performed. Correspondingly, when a network side device needs to transmit data to a terminal in an idle mode, a service request procedure triggered by the network side needs to be performed.

A fourth generation (4G) network is used as an example. FIG. 1 is a schematic diagram of a service request procedure triggered by a network side device in the prior art. As shown in FIG. 1, the service request procedure includes the following operations: Operation S101: A packet data network gateway (PGW) sends downlink data to a serving gateway (SGW). Operation S102: The SGW sends a downlink data notification message to a mobility management entity (MME). Operation S103: The MME sends a downlink data notification response message to the SGW. Operation S104: The MME sends a paging message to an evolved NodeB (eNodeB). Operation S105: The eNodeB sends the paging message to a terminal. Operation S106: The terminal sends non-access stratum (NAS) signaling, that is, service request signaling to the eNodeB. Operation S107: The eNodeB sends the service request signaling to the MME. Operation S108: Perform a security authentication process (optional). Operation S109: The MME sends S1-AP signaling to the eNodeB, that is, a context setup request message, to request the eNodeB to prepare context for the terminal. Operation S110: Set up a radio bearer between the terminal and the eNodeB, to transmit downlink data. Operation S111: The eNodeB sends a context setup response message to the MME. Operation S112: The MME sends a bearer modify request to the SGW. Operation S113: The SGW sends a bearer modify response to the MME. Operation S112 and operation S113 are to set up a non-shared bearer for the downlink data. If a radio access technology (RAT) of the terminal changes, operation S114 to operation S117 further need to be performed. Operation S114: The SGW sends a bearer modify request to a PGW. Operation S115: The PGW requests a PCRF to modify a quality of service (QoS) rule. Operation S116: The PGW sends a bearer modify response to the SGW. Operation S117: The SGW sends the bearer modify response to the MME. Operation S118: The SGW sends a paging stop message to the MME. Operation S119: The SGW sends the downlink data to the terminal.

In the prior art, a downlink data sending delay is high, and downlink data transmission efficiency is low.

SUMMARY

Embodiments of this application provide a downlink data transmission method and apparatus, to reduce a downlink data transmission delay, thereby improving downlink data transmission efficiency.

According to a first aspect, an embodiment of this application provides a downlink data transmission method, including:

receiving, by a user plane device, downlink data of a terminal, where the terminal is in an idle mode; and sending, by the user plane device, the downlink data by using a shared bearer to an access network device that is in a tracking area of the terminal.

The user plane device first sends the downlink data by using the shared bearer between the user plane device and the access network device, instead of sending, by the SGW, the downlink data to the terminal after operation S113 or operation S117 by using the non-shared bearer in FIG. 1. The method can reduce a downlink data transmission delay and improve downlink data transmission efficiency.

In one embodiment, the sending, by the user plane device, the downlink data by using a shared bearer to an access network device that is in a tracking area of the terminal includes:

sending, by the user plane device, a downlink data notification message to a control plane device;

receiving, by the user plane device, a downlink data notification response message sent by the control plane device; and sending, by the user plane device, the downlink data to the access network device based on the downlink data notification response message by using the shared bearer.

In this optional implementation, the downlink data notification response message is used to trigger the user plane device to send the downlink data to the access network device by using the shared bearer.

In one embodiment, the sending, by the user plane device, the downlink data to the access network device based on the downlink data notification response message by using the shared bearer includes:

when the downlink data notification response message carries fast call instruction information, sending, by the user plane device, the downlink data to the access network device by using the shared bearer, where the fast call instruction information is used to instruct the user plane device to send the downlink data to the access network device by using the shared bearer.

In this optional implementation, triggered by the fast call instruction information, the user plane device sends the downlink data to the access network device by using the shared bearer. In this way, data transmission efficiency is improved.

In one embodiment, the method further includes:

receiving, by the user plane device, a paging message sent by the control plane device; and sending, by the user plane device, the paging message to the access network device, so that the access network device sends the paging message to the terminal.

In this optional implementation, the control plane device first sends the paging message to the user plane device, where the paging message may be carried in a tracking area update request message. Then, the user plane device sends the paging message to the access network device while sending the downlink data to the access network device.

Finally, the access network device sends the downlink data to the terminal. In this way, downlink data sending efficiency is improved.

In one embodiment, the sending, by the user plane device, the downlink data by using a shared bearer to an access network device that is in a tracking area of the terminal includes:

sending, by the user plane device, the downlink data to the access network device in a multicast manner by using the shared bearer.

In one embodiment, the method further includes: sending, by the user plane device, identification information of a first non-shared bearer to the access network device by using the shared bearer, where the identification information of the first non-shared bearer is used to indicate a non-shared bearer used to transmit the downlink data between the user plane device and the access network device.

In one embodiment, the control plane device is a mobility management entity MME, and the user plane device is a serving gateway SGW;

the control plane device and the user plane device are both serving general packet radio service support nodes SGSNs; or the control plane device is a session management functional entity, and the user plane device is a user plane gateway functional entity.

According to a second aspect, an embodiment of this application provides a downlink data transmission method, including:

receiving, by an access network device, downlink data of a terminal that is sent by a user plane device by using a shared bearer;

receiving, by the access network device, a context setup request message sent by a control plane device, where the context setup request message carries path-related information of the terminal;

setting up, by the access network device, a radio bearer between the access network device and the terminal based on the context setup request message; and sending, by the access network device, the downlink data to the terminal by using the radio bearer.

The method can reduce a downlink data transmission delay and improve downlink data transmission efficiency.

In one embodiment, the method further includes: receiving, by the access network device, identification information of a first non-shared bearer that is sent by the user plane device by using the shared bearer, where the identification information of the first non-shared bearer is used to indicate a non-shared bearer used to transmit the downlink data between the user plane device and the access network device.

In one embodiment, the path-related information includes identification information of a second non-shared bearer and a radio bearer parameter; and the setting up, by the access network device, a radio bearer between the access network device and the terminal based on the context setup request message includes:

when the identification information of the first non-shared bearer and the identification information of the second non-shared bearer indicate a same non-shared bearer, setting up, by the access network device, the radio bearer between the access network device and the terminal based on the radio bearer parameter.

In one embodiment, the method further includes:

setting up, by the access network device, a mapping relationship between the radio bearer and the identification information of the first non-shared bearer.

The access network device may determine, based on the mapping relationship between the radio bearer and the identification information of the first non-shared bearer and the identification information of the first non-shared bearer and in radio bearers that are set up, the radio bearer used to send the downlink data. Finally, the downlink data is sent by using the determined radio bearer.

In one embodiment, the path-related information includes a radio bearer parameter, filter information, and a first mapping relationship between the filter information and identification information of a third non-shared bearer; and the setting up, by the access network device, a radio bearer between the access network device and the terminal based on the context setup request message includes:

setting up, by the access network device, the radio bearer between the access network device and the terminal based on the radio bearer parameter.

In one embodiment, the method further includes: setting up, by the access network device, a second mapping relationship between the radio bearer and the identification information of the third non-shared bearer; and the sending, by the access network device, the downlink data to the terminal by using the radio bearer includes:

when the filter information successfully matches the downlink data, determining, by the access network device, the radio bearer based on the filter information, the first mapping relationship, and the second mapping relationship; and sending, by the access network device, the downlink data by using the determined radio bearer.

In one embodiment, the receiving, by an access network device, downlink data of a terminal that is sent by a user plane device by using a shared bearer includes:

receiving, by the access network device, the downlink data sent by the user plane device in a multicast manner by using the shared bearer.

In one embodiment, the control plane device is a mobility management entity MME, and the user plane device is a serving gateway SGW;

the control plane device and the user plane device are both serving general packet radio service support nodes SGSNs; or the control plane device is a session management functional entity, and the user plane device is a user plane gateway functional entity.

The following describes the downlink data transmission apparatus configured to perform the method corresponding to the foregoing user plane device, and corresponding technical effects are no longer described in detail subsequently.

According to a third aspect, an embodiment of this application provides a downlink data transmission apparatus, including:

a receiving module, configured to receive downlink data of a terminal, where the terminal is in an idle mode; and a sending module, configured to send the downlink data by using a shared bearer to an access network device that is in a tracking area of the terminal.

In one embodiment, the sending module is further configured to send a downlink data notification message to a control plane device;

the receiving module is further configured to receive a downlink data notification response message sent by the control plane device; and the sending module is specifically configured to send the downlink data to the access network device based on the downlink data notification response message by using the shared bearer.

In one embodiment, the sending module is specifically configured to: when the downlink data notification response message carries fast call instruction information, send the downlink data to the access network device by using the shared bearer, where the fast call instruction information is used to instruct the sending module to send the downlink data to the access network device by using the shared bearer.

In one embodiment, the receiving module is further configured to receive a paging message sent by the control plane device; and the sending module is further configured to send the paging message to the access network device, so that the access network device sends the paging message to the terminal.

In one embodiment, the sending module is specifically configured to send the downlink data to the access network device in a multicast manner by using the shared bearer.

In one embodiment, the sending module is further configured to send identification information of a first non-shared bearer to the access network device by using the shared bearer, where the identification information of the first non-shared bearer is used to indicate a non-shared bearer used to transmit the downlink data between the apparatus and the access network device.

In one embodiment, the control plane device is a mobility management entity MME, and the apparatus is a serving gateway SGW;

the control plane device and the apparatus are both serving general packet radio service support nodes SGSNs; or the control plane device is a session management functional entity, and the apparatus is a user plane gateway functional entity.

According to a fourth aspect, an embodiment of this application provides a downlink data transmission apparatus, including:

a receiving module, configured to:

receive downlink data of a terminal that is sent by a user plane device by using a shared bearer; and receive a context setup request message sent by a control plane device, where the context setup request message carries path-related information of the terminal;

a setup module, configured to set up a radio bearer between the apparatus and the terminal based on the context setup request message; and a sending module, configured to send the downlink data to the terminal by using the radio bearer.

In one embodiment, the receiving module is further configured to receive identification information of a first non-shared bearer that is sent by the user plane device by using the shared bearer, where the identification information of the first non-shared bearer is used to indicate a non-shared bearer used to transmit the downlink data between the user plane device and the apparatus.

In one embodiment, the path-related information includes identification information of a second non-shared bearer and a radio bearer parameter; and the setup module is specifically configured to:

when the identification information of the first non-shared bearer and the identification information of the second non-shared bearer indicate a same non-shared bearer, set up the radio bearer between the apparatus and the terminal based on the radio bearer parameter.

In one embodiment, the setup module is further configured to set up a mapping relationship between the radio bearer and the identification information of the first non-shared bearer.

In one embodiment, the path-related information includes a radio bearer parameter, filter information, and a first mapping relationship between the filter information and identification information of a third non-shared bearer; and the setup module is specifically configured to:

set up the radio bearer between the apparatus and the terminal based on the radio bearer parameter.

In one embodiment, the setup module is further configured to set up a second mapping relationship between the radio bearer and the identification information of the third non-shared bearer; and the sending module is specifically configured to:

when the filter information successfully matches the downlink data, determine the radio bearer based on the filter information, the first mapping relationship, and the second mapping relationship; and send the downlink data by using the determined radio bearer.

In one embodiment, the receiving module is specifically configured to:

receive the downlink data sent by the user plane device in a multicast manner by using the shared bearer.

In one embodiment, the control plane device is a mobility management entity MME, and the user plane device is a serving gateway SGW;

the control plane device and the user plane device are both serving general packet radio service support nodes SGSNs; or the control plane device is a session management functional entity, and the user plane device is a user plane gateway functional entity.

According to a fifth aspect, an embodiment of this application provides a downlink data transmission apparatus, including:

a receiver, configured to receive downlink data of a terminal, where the terminal is in an idle mode; and a transmitter, configured to send the downlink data by using a shared bearer to an access network device that is in a tracking area of the terminal.

In one embodiment, the transmitter is further configured to send a downlink data notification message to a control plane device;

the receiver is further configured to receive a downlink data notification response message sent by the control plane device; and the transmitter is specifically configured to send the downlink data to the access network device based on the downlink data notification response message by using the shared bearer.

In one embodiment, the transmitter is specifically configured to:

when the downlink data notification response message carries fast call instruction information, send the downlink data to the access network device by using the shared bearer, where the fast call instruction information is used to instruct the sending module to send the downlink data to the access network device by using the shared bearer.

In one embodiment, the receiver is further configured to receive a paging message sent by the control plane device; and the transmitter is further configured to send the paging message to the access network device, so that the access network device sends the paging message to the terminal.

In one embodiment, the transmitter is specifically configured to:

send the downlink data to the access network device in a multicast manner by using the shared bearer.

In one embodiment, the transmitter is further configured to send identification information of a first non-shared bearer to the access network device by using the shared bearer, where the identification information of the first non-shared bearer is used to indicate a non-shared bearer used to transmit the downlink data between the apparatus and the access network device.

In one embodiment, the control plane device is a mobility management entity MME, and the apparatus is a serving gateway SGW;

the control plane device and the apparatus are both serving general packet radio service support nodes SGSNs; or the control plane device is a session management functional entity, and the apparatus is a user plane gateway functional entity.

According to a sixth aspect, an embodiment of this application provides a downlink data transmission apparatus, including:

a receiver, configured to:

receive downlink data of a terminal that is sent by a user plane device by using a shared bearer; and receive a context setup request message sent by a control plane device, where the context setup request message carries path-related information of the terminal;

a processor, configured to set up a radio bearer between the apparatus and the terminal based on the context setup request message; and a transmitter, configured to send the downlink data to the terminal by using the radio bearer.

In one embodiment, the receiver is further configured to receive identification information of a first non-shared bearer that is sent by the user plane device by using the shared bearer, where the identification information of the first non-shared bearer is used to indicate a non-shared bearer used to transmit the downlink data between the user plane device and the apparatus.

In one embodiment, the path-related information includes identification information of a second non-shared bearer and a radio bearer parameter; and the processor is specifically configured to:

when the identification information of the first non-shared bearer and the identification information of the second non-shared bearer indicate a same non-shared bearer, set up the radio bearer between the apparatus and the terminal based on the radio bearer parameter.

In one embodiment, the processor is further configured to set up a mapping relationship between the radio bearer and the identification information of the first non-shared bearer.

In one embodiment, the path-related information includes a radio bearer parameter, filter information, and a first mapping relationship between the filter information and identification information of a third non-shared bearer; and the processor is specifically configured to:

set up the radio bearer between the apparatus and the terminal based on the radio bearer parameter.

In one embodiment, the processor is further configured to set up a second mapping relationship between the radio bearer and the identification information of the third non-shared bearer; and the transmitter is specifically configured to:

when the filter information successfully matches the downlink data, determine the radio bearer based on the filter information, the first mapping relationship, and the second mapping relationship; and send the downlink data by using the determined radio bearer.

In one embodiment, the receiver is specifically configured to:

receive the downlink data sent by the user plane device in a multicast manner by using the shared bearer.

In one embodiment, the control plane device is a mobility management entity MME, and the user plane device is a serving gateway SGW;

the control plane device and the user plane device are both serving general packet radio service support nodes SGSNs; or the control plane device is a session management functional entity, and the user plane device is a user plane gateway functional entity.

This application provides a downlink data transmission method and apparatus. The method includes: receiving, by a user plane device, downlink data of a terminal, sending, by the user plane device, the downlink data by using a shared bearer to an access network device that is in a tracking area of the terminal, receiving, by the access network device, a context setup request message sent by a control plane device, setting up, by the access network device, a radio bearer between the access network device and the terminal based on the context setup request message, and sending, by the access network device, the downlink data to the terminal by using the radio bearer. In this way, the method can reduce a downlink data transmission delay and improve downlink data transmission efficiency.

DESCRIPTION OF EMBODIMENTS

The following uses an evolved packet system (EPS), that is, a 4G system as an example to briefly describe a communications system.

Figure 2:
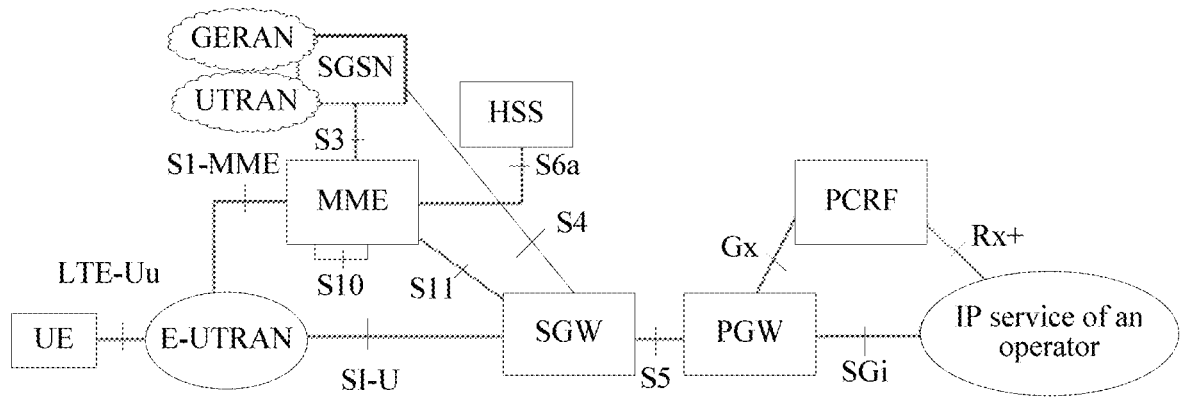
FIG. 2 is a schematic diagram of an EPS network architecture according to an embodiment of this application.
Figure 3:
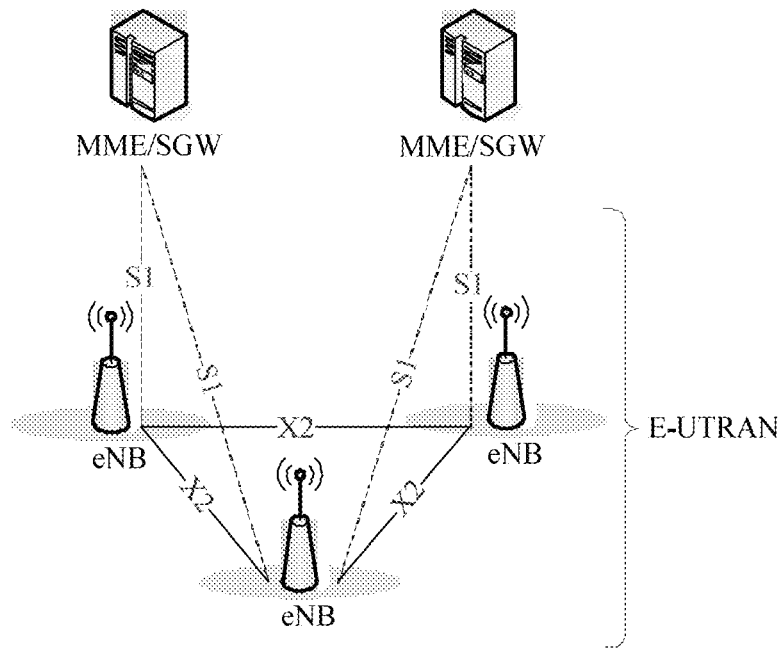
FIG. 3 is a schematic architectural diagram of an E-UTRAN according to an embodiment of this application.

FIG. 2 is a schematic diagram of an EPS network architecture according to an embodiment of this application. FIG. 3 is a schematic architectural diagram of an evolved universal terrestrial radio access network (E-UTRAN) according to an embodiment of this application.

An EUTRAN is a network including a plurality of eNodeBs, and implements a wireless physical layer function and functions of resource scheduling, radio resource management, radio access control, and mobility management. The eNodeBs may be connected by using an X2 interface and may be configured to transmit data in an X2-based switching process. The eNodeB is connected to an SGW by using a user plane interface S1-U and transfers user data by using General Packet Radio System Tunneling Protocol User Plane (GTP-U); and is connected to an MME by using a control plane interface S1-MME, and implements a function such as radio access bearer control by using an S1-AP protocol.

The MME is mainly responsible for a control plane function of user session management, including NAS signaling and security, tracking area list management, selection of a PGW and an SGW, and the like.

The SGW is mainly responsible for data transmission, forwarding, routing switching, and the like of a terminal, and is used as a local mobility anchor when the terminal switches between eNodeBs (only one SGW serves for each terminal at each moment).

The PGW is used as an anchor of a packet data network (PDN) connection, and is responsible for assigning an Internet Protocol (IP) address for user equipment, filtering a data packet of a terminal, controlling a rate, generating charging information, and the like.

An SGSN is an access node of a Global System for Mobile Communications/enhanced data rates for GSM evolution radio access network (GERAN), Universal Terrestrial Radio Access Network (UTRAN), and an evolved packet core (EPC) of an EPS, and is responsible for setting up a bearer and forwarding data from the GERAN or the UTRAN to the EPC.

An HSS stores subscription data of a mobile user.

A policy and charging rules function (PCRF) is responsible for charging management and policy control, and includes a policy and charging control (PCC) rule and a QoS rule.

The problem of a relatively high downlink data sending delay and relatively low transmission efficiency in a 4G network still exists in 2G and 3G networks. Based on different network elements in 2G, 3G, and 4G networks, in this application, a serving general packet radio service support node (SGSN) in 2G and 3G networks, an MME in a 4G network, and a session management functional entity in a future 5G network are collectively referred to as a control plane device. A SGSN in 2G and 3G networks, an SGW in a 4G network, and a user plane gateway functional entity in a future 5G network are collectively referred to as a user plane device. A base station controller (BSC) in a 2G network, a radio network controller (RNC) in a 3G network, an eNodeB in a 4G network, and a network element similar to the BSC, the RNC, or the eNodeB in a future 5G network are collectively referred to as an access network device.

To resolve the problem of a relatively high downlink data sending delay and relatively low transmission efficiency in networks such as 2G, 3G, and 4G networks and even a 5G network, embodiments of this application provide a downlink data transmission method and apparatus.

Figure 1:
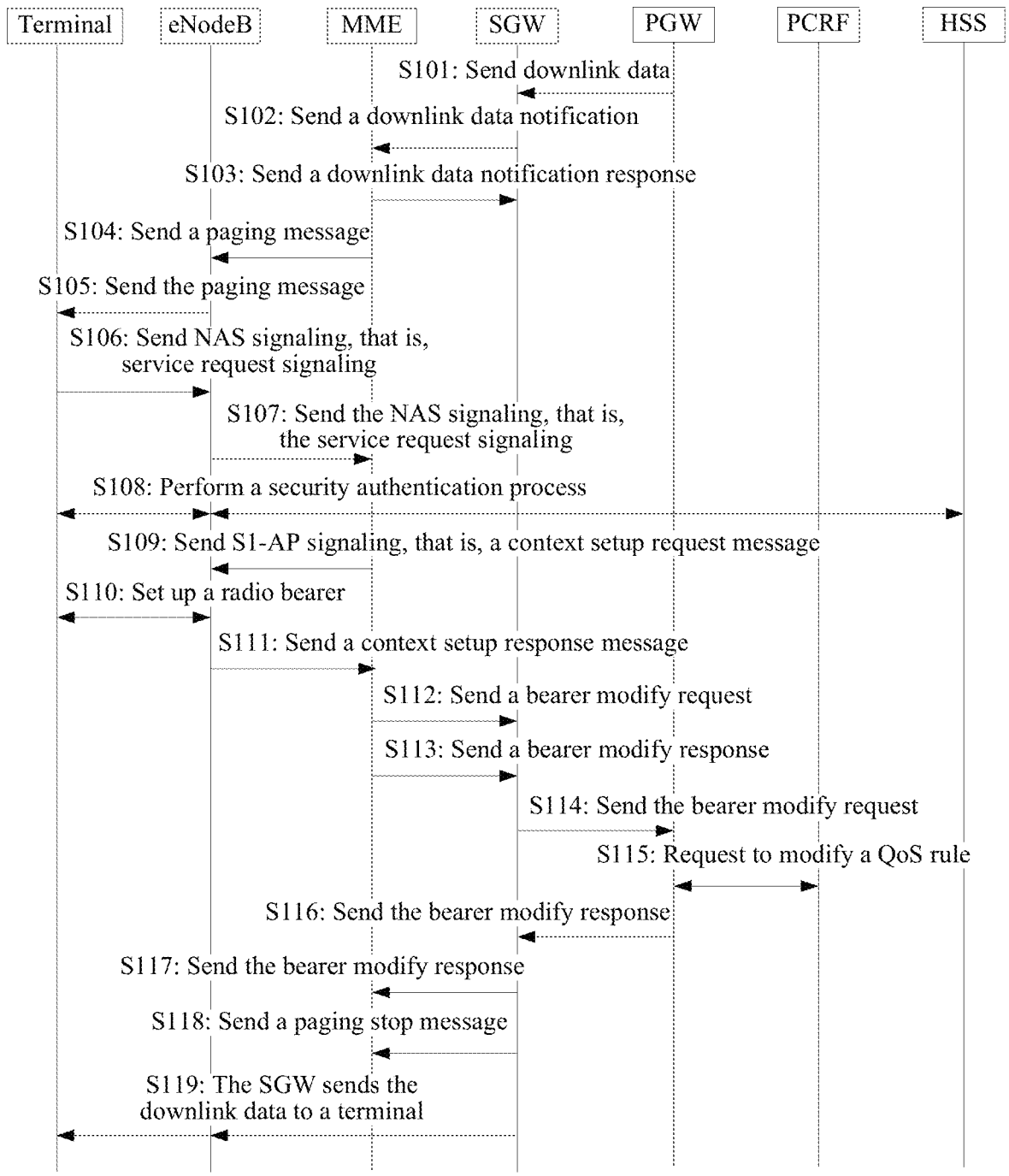
FIG. 1 is a schematic diagram of a service request procedure triggered by a network side device in the prior art.

In one embodiment, when receiving downlink data sent to a terminal in an idle mode, a user plane device may send the downlink data by using a shared bearer to an access network device that is in a tracking area (TA) of the terminal; the access network device caches the downlink data and receives a context setup request message sent by a control plane device; the access network device sets up a radio bearer between the access network device and the terminal based on the context setup request message; and the access network device sends the downlink data to the terminal by using the radio bearer. In one embodiment, the user plane device first sends the downlink data by using the shared bearer between the user plane device and the access network device, instead of sending, by the SGW, the downlink data to the terminal only after operation S113 or operation S117 by using the non-shared bearer in FIG. 1. The method can reduce a downlink data transmission delay and improve downlink data transmission efficiency.

In the embodiments of the present invention, the control plane device is an MME and the user plane device is a serving gateway SGW; the control plane device and the user plane device are both SGSNs; or the control plane device is a session management functional entity and the user plane device is a user plane gateway functional entity. Details are not described again subsequently.

Figure 4:
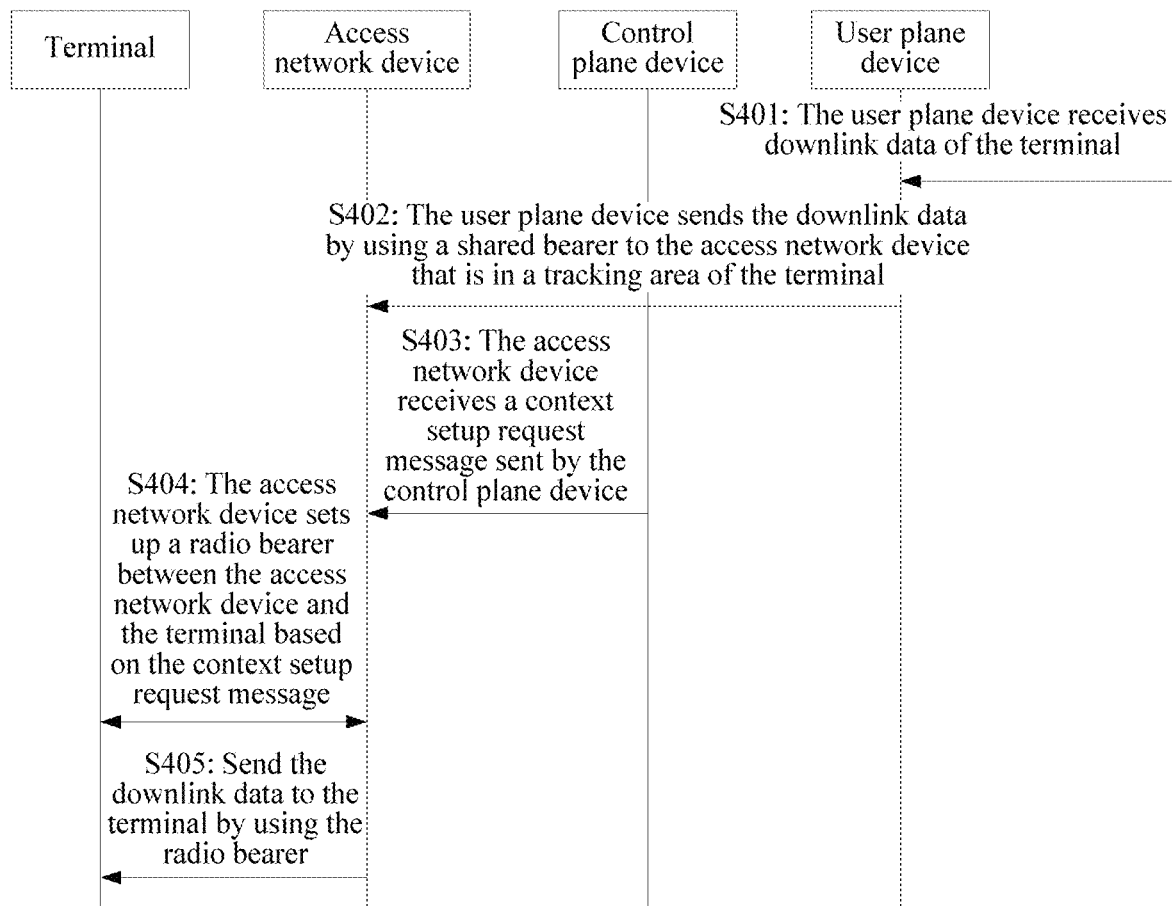
FIG. 4 is an interaction flowchart of a downlink data transmission method according to an embodiment of this application.

Specifically, FIG. 4 is an interaction flowchart of a downlink data transmission method according to an embodiment of this application. The method includes the following network elements: a terminal, an access network device, a control plane device, and a user plane device. As shown in FIG. 4, the method includes the following procedure:

Operation S401: A user plane device receives downlink data of a terminal, where the terminal is in an idle mode.

The downlink data of the terminal may be downlink data sent by the user plane device to the terminal. The downlink data may be a downlink IP data packet, and the IP data packet includes downlink service data and 5-tuple sent to the terminal. The 5-tuple may include: a source IP address, a source port, a destination IP address, a destination port, and a transport layer protocol.

Operation S402: The user plane device sends the downlink data by using a shared bearer to an access network device that is in a tracking area of the terminal.

The shared bearer is a bearer between the user plane device and the access network device, the shared bearer may be set up before the user plane device receives the downlink data, and a control plane device may trigger the user plane device to send the downlink data by using the shared bearer to the access network device that is in the tracking area of the terminal. The shared bearer is a bearer shared by all or some terminals in the tracking area.

In an example, the user plane device may send the downlink data by using the shared bearer to all access network devices that are in the tracking area of the terminal.

In one embodiment, identification information of a first non-shared bearer may be further transmitted by using the shared bearer, where the identification information of the first non-shared bearer is used to indicate a non-shared bearer used to transmit the downlink data between the user plane device and the access network device. In 2G, 3G, and 4G networks, the identification information of the first non-shared bearer may be an S1 bearer identifier. The S1 bearer identifier is a path identifier between the user plane device and the access network device, for example, an evolved packet system radio access bearer (ERAB) identifier or an SGW tunnel endpoint identifier (TEID). In a 5G network, the identification information of the first non-shared bearer may be an NG3 marking. The NG3 marking is a data stream identifier between the user plane device and the access network device. The identification information of the first non-shared bearer may be carried in a protocol header of the shared bearer used to transmit the downlink data, for example, a GTP-U protocol header or a user datagram protocol (UDP) header.

In an example, there is a correspondence between the shared bearer and the non-shared bearer, so that after the non-shared bearer between the user plane device and the access network device is set up, the user plane device may switch the downlink data on the shared bearer to the corresponding non-shared bearer.

Operation S403: The access network device receives a context setup request message sent by the control plane device, where the context setup request message carries path-related information of the terminal.

In one embodiment, the path-related information may be specifically in the following three forms:

Form 1: the path-related information includes identification information of a second non-shared bearer and a radio bearer parameter; and the identification information of the second non-shared bearer is identification information of a non-shared bearer corresponding to the terminal.

Form 2: the path-related information includes a radio bearer parameter, filter information, and a first mapping relationship between the filter information and identification information of a third non-shared bearer. The identification information of the third non-shared bearer is identification information of a non-shared bearer corresponding to the terminal.

Form 3: the path-related information includes a radio bearer parameter, filter information, and identification information of a third non-shared bearer. In this case, there is an implicit mapping relationship between the filter information and the identification information of the third non-shared bearer. The identification information of the third non-shared bearer is identification information of a non-shared bearer corresponding to the terminal.

The radio bearer parameter includes: a QoS class identifier (QCI) or a quality parameter, and the QCI may be used to indicate the quality parameter. The quality parameter is a quality condition that a radio bearer to be used to send the downlink data needs to satisfy. The quality parameter may be a resource type, a priority, a packet loss rate, a delay budget, and the like.

In one embodiment, before operation S403, the method further includes: sending, by the terminal, service request signaling to the access network device; and sending, by the access network device, the service request signaling to the control plane device. The control plane device may determine, by using the service request signaling, a specific access network device to which the context setup request message is sent to.

Operation S404: The access network device sets up a radio bearer between the access network device and the terminal based on the context setup request message.

In operation S404, setting up the radio bearer between the access network device and the terminal may also be referred to as restoring the radio bearer between the access network device and the terminal.

For example, in a 4G network, the terminal stores context information, where the context information may include an EPS bearer identifier, a filter template (TFT), and a QCI. An EPS bearer may include: an ERAB bearer and an S5/S8 bearer, and the ERAB bearer may include: a radio bearer and an S1 bearer. The EPS bearer identifier may be an ERAB identifier. The ERAB identifier corresponds one-to-one to an S1 bearer identifier, and the ERAB identifier also corresponds one-to-one to a radio bearer identifier. Therefore, that the access network device restores the radio bearer between the access network device and the terminal may include: first, the access network device may set up a new radio bearer based on a QCI of a previous radio bearer of the terminal. Then, context information of the terminal is set up again in a radio access network (RAN) and the EPS bearer and the S1 bearer are associated with the new radio bearer that is set up. Finally, the access network device sends an RRC connection reconfiguration message to the terminal, where the message carries an identifier of the old EPS bearer and an identifier of the new radio bearer, so that the terminal sets up a mapping relationship between the identifier of the EPS bearer and the identifier of the radio bearer. The terminal sends an RRC connection reconfiguration complete message to the access network device. In this case, the entire radio bearer restoration process ends.

Operation S405: The access network device sends the downlink data to the terminal by using the radio bearer.

In one embodiment, operation S405 specifically includes: sending, by the user plane device, a downlink data notification (DDN) message to the control plane device. The user plane device receives a downlink data notification response message sent by the control plane device. The user plane device sends the downlink data to the access network device based on the downlink data notification response message by using the shared bearer. The downlink data notification response message is used to trigger the access network device to send the downlink data to the terminal.

Embodiments of this application provide a downlink data transmission method. The method includes: receiving, by a user plane device, downlink data of a terminal, sending, by the user plane device, the downlink data by using a shared bearer to an access network device that is in a tracking area of the terminal, receiving, by the access network device, a context setup request message sent by a control plane device, setting up, by the access network device, a radio bearer between the access network device and the terminal based on the context setup request message, and sending, by the access network device, the downlink data to the terminal by using the radio bearer. The user plane device first sends the downlink data by using the shared bearer between the user plane device and the access network device, instead of sending, by the SGW, the downlink data to the terminal after operation S113 or operation S117 by using the non-shared bearer. In this way, the method can reduce a downlink data transmission delay and improve downlink data transmission efficiency.

Based on the three forms of the path-related information, the following describes operation S404 to operation S405 in detail.

In one embodiment, in a first implementation scenario of the foregoing embodiment, the method further includes:

receiving, by the access network device, the identification information of the first non-shared bearer that is sent by the user plane device by using the shared bearer.

The identification information of the first non-shared bearer is used to indicate a non-shared bearer used to transmit the downlink data between the user plane device and the access network device.

Further, the path-related information in operation S403 may include the identification information of the second non-shared bearer and the radio bearer parameter; and operation S404 may include:

When the identification information of the first non-shared bearer and the identification information of the second non-shared bearer indicate a same non-shared bearer, the access network device sets up the radio bearer between the access network device and the terminal based on the radio bearer parameter.

Further, the method may further include:

setting up, by the access network device, a mapping relationship between the radio bearer and the identification information of the first non-shared bearer; determining, based on the mapping relationship between the radio bearer and the identification information of the first non-shared bearer and the identification information of the first non-shared bearer and in radio bearers that are set up, the radio bearer used to send the downlink data; and finally, sending the downlink data by using the determined radio bearer.

In one embodiment, in a second implementation scenario of the foregoing embodiment, the path-related information in operation S403 includes the radio bearer parameter, the filter information, and the first mapping relationship between the filter information and the identification information of the third non-shared bearer; and operation S404 may specifically include:

setting up, by the access network device, the radio bearer between the access network device and the terminal based on the radio bearer parameter.

Further, the method may further include: setting up, by the access network device, a second mapping relationship between the radio bearer and the identification information of the third non-shared bearer; and operation S405 may specifically include:

when the filter information successfully matches the downlink data, determining, by the access network device, the radio bearer based on the filter information, the first mapping relationship, and the second mapping relationship; and sending, by the access network device, the downlink data by using the determined radio bearer.

The downlink data is an IP data packet, and the IP data packet may include downlink service data and 5-tuple sent to the terminal. The 5-tuple may include: a source IP address, a source port, a destination IP address, a destination port, and a transport layer protocol. For example, the source IP address and the destination IP address may both be a wildcard character * or a specific IPv4/IPv6 address, the source port and the destination port may both be a wildcard character * or a specific port number, and the transport layer protocol may be TCP/UDP or the like. That the filter information successfully matches the downlink data is that the filter information successfully matches the 5-tuple of the downlink data. A filter is indicated in a form of the 5-tuple (the source IP, the destination IP, the source port, the destination port, and the transport layer protocol). For example, the filter is in a form of (*, *, 53, *, UDP). A returned result of a DNS may match the filter. For example, the IP address of the terminal is 192.168.1.121, and an address of a local DNS server is 192.168.1.255. In this case, the downlink data is sent to the terminal by using a protocol header (192.168.1.255, 192.168.1.121, 53, 3333, UDP). That is, when the DNS resolves a result, the downlink data successfully matches the filter (*, *, 53, *, UDP).

In one embodiment, the determining, by the access network device, the radio bearer based on the filter information, the first mapping relationship, and the second mapping relationship includes: first, the access network device may determine the identification information of the third non-shared bearer based on the filter information and the first mapping relationship; then, the access network device may determine the radio bearer based on the identification information of the third non-shared bearer and the second mapping relationship; and finally, the access network device sends the downlink data by using the determined radio bearer.

In one embodiment, in a third implementation scenario of the foregoing embodiment, the path-related information in operation S403 includes the radio bearer parameter, the filter information, and the identification information of the third non-shared bearer; and operation S404 may specifically include:

setting up, by the access network device, the radio bearer between the access network device and the terminal based on the radio bearer parameter.

Further, the method may further include: setting up, by the access network device, a second mapping relationship between the radio bearer and the identification information of the third non-shared bearer; and operation S405 may specifically include:

when the downlink data successfully matches the filter information, determining the radio bearer based on the filter information, the implicit first mapping relationship between the identification information of the third non-shared bearer and the filter information, and the second mapping relationship.

For example, first, the access network device may determine the identification information of the third non-shared bearer based on the filter information and the implicit first mapping relationship; and then, may determine the radio bearer based on the identification information of the third non-shared bearer and the second mapping relationship. Finally, the access network device sends the downlink data by using the determined radio bearer.

The third optional implementation is similar to the second optional implementation, and a difference lies in that in the second optional implementation, the first mapping relationship between the filter information and the identification information of the third non-shared bearer is an explicit mapping relationship, but in the third optional implementation, the mapping relationship between the filter information and the identification information of the third non-shared bearer is an implicit mapping relationship.

Figure 5:
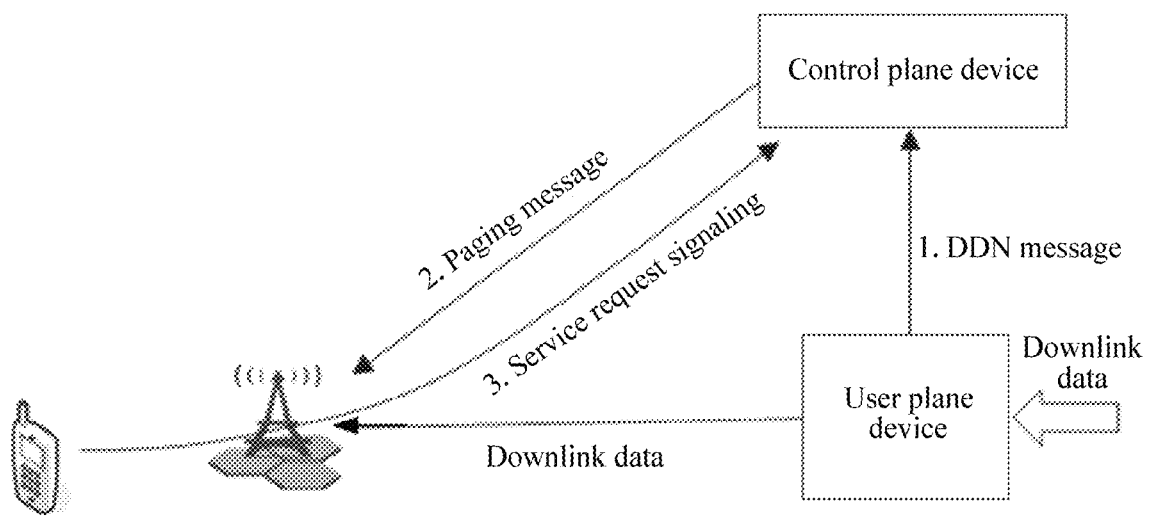
FIG. 5 is a schematic diagram of an application scenario of a downlink data transmission method according to an embodiment of this application.

FIG. 5 is a schematic diagram of an application scenario of a downlink data transmission method according to an embodiment of this application. As shown in FIG. 5, a user plane device receives downlink data sent by another terminal to a terminal in an idle mode; and the user plane device is responsible for sending a DDN message to a control plane device and sending the downlink data to an access network device. The control plane device is responsible for sending a paging message to the access network device, and receiving service request signaling sent by the access network device.

The following specifically describes a downlink data transmission method with reference to the scenario shown in FIG. 5 and the foregoing first and third implementation scenarios. Because the second implementation scenario is similar to the third implementation scenario, this application no longer describes the downlink data transmission method in detail based on the scenario shown in FIG. 5 and the second implementation scenario.

Figure 6:
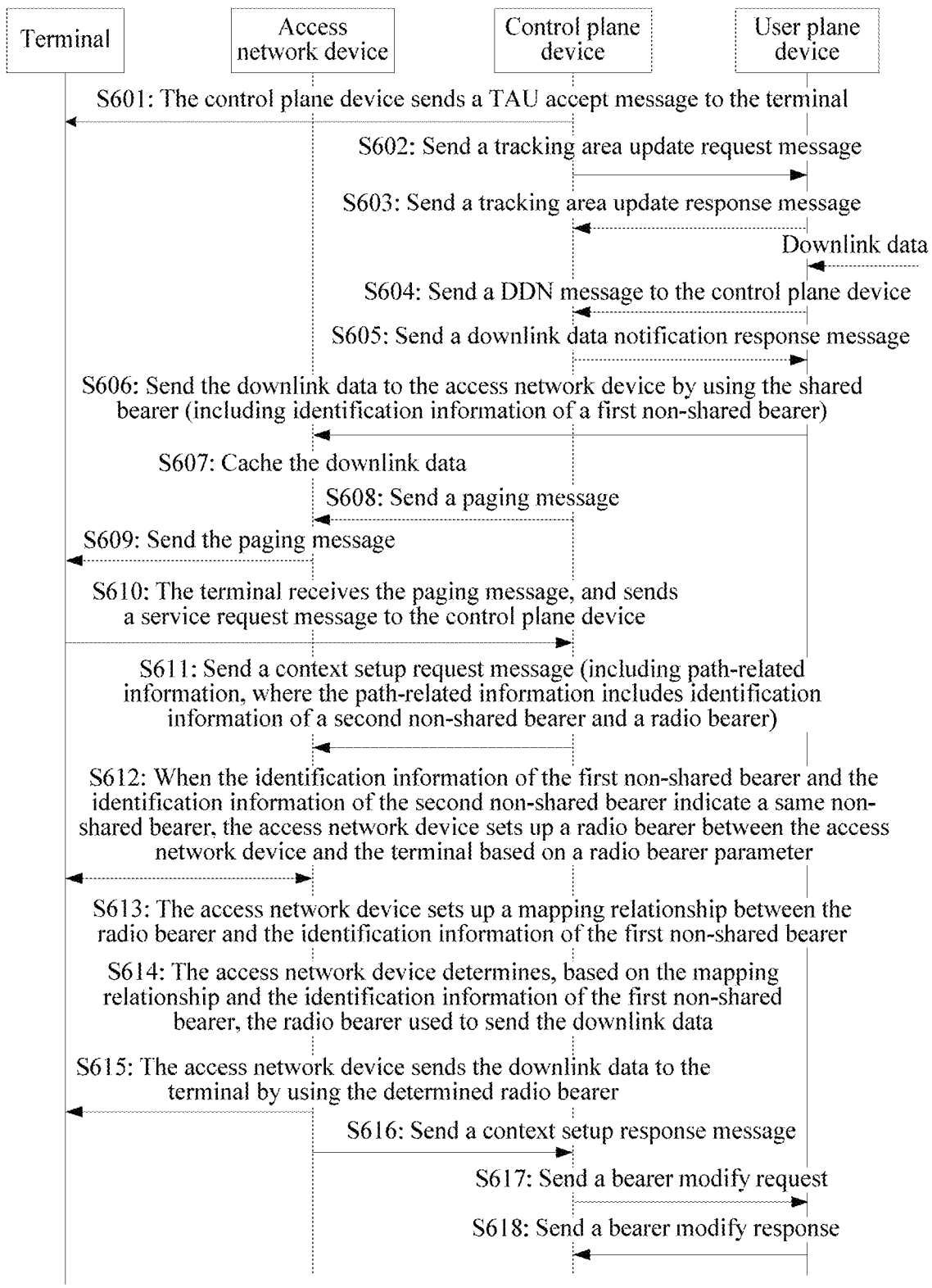
FIG. 6 is an interaction flowchart of a downlink data transmission method according to another embodiment of this application.

In a first implementation scenario, specifically, FIG. 6 is an interaction flowchart of a downlink data transmission method according to another embodiment of this application. As shown in FIG. 6, the method includes the following procedure:

Operation S601: A control plane device sends a tracking area update (TAU) accept message to a terminal.

Operation S602: The control plane device sends a tracking area update request message to a user plane device.

The tracking area update request message includes a tracking area list (TA List) corresponding to the terminal.

Operation S603: The user plane device sends a tracking area update response message to the control plane device.

Operation S604: When receiving downlink data sent to the terminal in an idle mode, the user plane device sends a DDN message to the control plane device.

Operation S605: The control plane device sends a downlink data notification response message to the user plane device.

Operation S606: The user plane device sends the downlink data to an access network device by using a shared bearer.

The user plane device may send the downlink data to the access network device in a multicast manner by using the shared bearer.

In an example, the user plane device may send the downlink data by using the shared bearer to all access network devices that are in the tracking area of the terminal.

The downlink data may include the identification information of the first non-shared bearer.

Operation S607: The access network device caches the downlink data.

Operation S608: The control plane device sends a paging message to the access network device.

Operation S609: The access network device sends the paging message to the terminal.

Operation S610: The terminal receives the paging message, and sends a service request message to the control plane device.

Operation S611: The control plane device sends a context setup request message to the access network device.

The context setup request message includes path-related information, the path-related information may include identification information of a second non-shared bearer and a radio bearer parameter, and the identification information of the second non-shared bearer is identification information of a non-shared bearer corresponding to the terminal.

Operation S612: When the identification information of the first non-shared bearer and the identification information of the second non-shared bearer indicate a same non-shared bearer, the access network device sets up a radio bearer between the access network device and the terminal based on the radio bearer parameter.

Operation S613: The access network device sets up a mapping relationship between the radio bearer and the identification information of the first non-shared bearer.

Operation S614: The access network device determines, based on the mapping relationship and the identification information of the first non-shared bearer, a radio bearer used to send the downlink data.

In one embodiment, the access network device determines, based on the mapping relationship and the identification information of the first non-shared bearer and in radio bearers that are set up, the radio bearer used to send the downlink data.

Operation S615: The access network device sends the downlink data to the terminal by using the determined radio bearer.

Operation S616: The access network device sends a context setup response message to the control plane device.

Operation S617: The control plane device sends a bearer modify request to the user plane device.

Operation S618: The user plane device sends a bearer modify response to the control plane device.

Operation S617 and operation S618 are used to switch the downlink data from the shared bearer to the non-shared bearer.

Operation 601 is an optional operation, and this embodiment is only an example for description.

In one embodiment, the access network device may set up the radio bearer between the access network device and the terminal based on the identification information of the first non-shared bearer that is included in the downlink data, and the identification information of the second non-shared bearer and the radio bearer parameter that are included in the path-related information.

Figure 7:
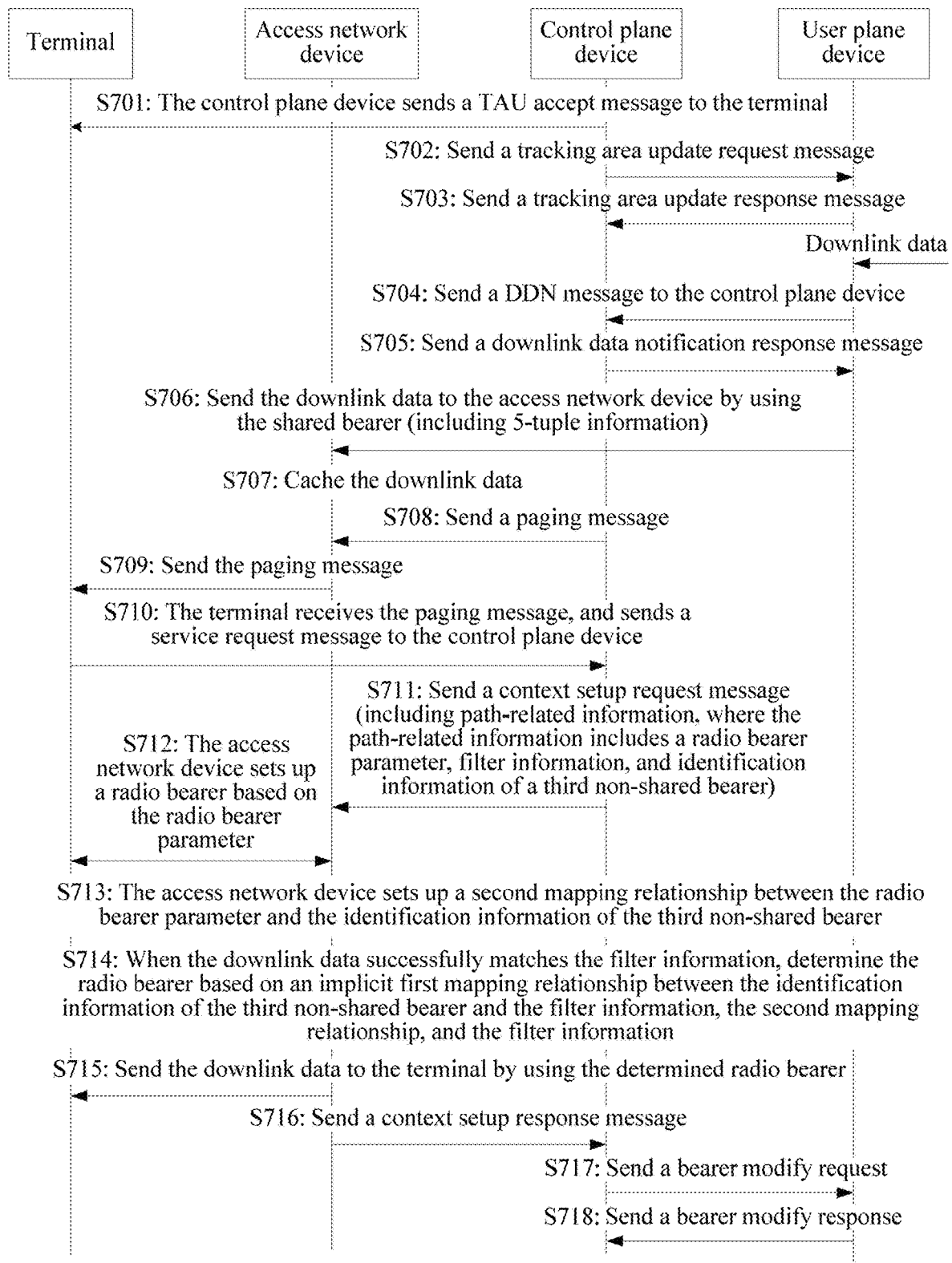
FIG. 7 is an interaction flowchart of a downlink data transmission method according to still another embodiment of this application.

In the third implementation scenario, FIG. 7 is an interaction flowchart of a downlink data transmission method according to still another embodiment of this application. As shown in FIG. 7, the method includes the following procedure:

Operation S701: A control plane device sends a TAU accept message to a terminal.

Operation S702: The control plane device sends a tracking area update request message to a user plane device.

The tracking area update request message may include a tracking area list (TA List) corresponding to the terminal.

Operation S703: The user plane device sends a tracking area update response message to the control plane device.

Operation S704: When receiving downlink data sent to the terminal in an idle mode, the user plane device sends a downlink data notification DDN message to the control plane device.

Operation S705: The control plane device sends a downlink data notification response message to the user plane device.

Operation S706: The user plane device sends the downlink data to an access network device by using a shared bearer.

The downlink data may include 5-tuple information.

In an example, the user plane device may send the downlink data by using the shared bearer to all access network devices that are in the tracking area of the terminal.

Operation S707: The access network device caches the downlink data.

Operation S708: The control plane device sends a paging message to the access network device.

Operation S709: The access network device sends the paging message to the terminal.

Operation S710: The terminal receives the paging message, and sends a service request message to the control plane device. Operation S711: The control plane device sends a context setup request message to the access network device, to request the access network device to prepare context for the terminal.

The context setup request message may include path-related information. The path-related information may include a radio bearer parameter, filter information, and identification information of a third non-shared bearer.

Operation S712: The access network device sets up a radio bearer based on the radio bearer parameter.

Operation S713: The access network device sets up a second mapping relationship between the radio bearer parameter and the identification information of the third non-shared bearer.

Operation S714: When the downlink data successfully matches the filter information, determine the radio bearer based on the implicit first mapping relationship between the identification information of the third non-shared bearer and the filter information, the second mapping relationship, and the filter information.

In one embodiment, the access network device may determine the identification information of the third non-shared bearer based on the filter information and the implicit first mapping relationship; and then, may determine the radio bearer based on the identification information of the third non-shared bearer and the second mapping relationship.

Operation S715: The access network device sends the downlink data to the terminal by using the determined radio bearer.

Operation S716: The access network device sends a context setup response message to the control plane device.

Operation S717: The control plane device sends a bearer modify request to the user plane device.

Operation S718: The user plane device sends a bearer modify response to the control plane device.

Operation S717 and operation S718 are used to switch the downlink data from the shared bearer to the non-shared bearer.

Operation 701 is an optional operation, and this embodiment is only an example for description.

In one embodiment, the access network device may set up the radio bearer between the access network device and the terminal based on the downlink data and the path-related information. The path-related information includes a radio bearer parameter, filter information, and identification information of a third non-shared bearer.

In one embodiment, operation S401, operation S606, and operation S706 specifically include: sending, by the user plane device, the downlink data to the access network device in a multicast manner by using the shared bearer.

In one embodiment, operation S401, operation S606, and operation S706 specifically include: sending, by the user plane device, a DDN message to the control plane device, receiving, by the user plane device, a downlink data notification response message sent by the control plane device, and sending, by the user plane device, the downlink data to the access network device based on the downlink data notification response message by using the shared bearer.

Specifically, the shared bearer between the user plane device and the access network device has been set up when the downlink data is received. The downlink data notification response message sent by the control plane device to the user plane device has two effects: A first effect is to notify the user plane device that the downlink data may be sent. A second effect is that the downlink data notification response message may be used to trigger the user plane device to send the downlink data to the access network device by using the shared bearer.

In one embodiment, the sending, by the user plane device, the downlink data to the access network device based on the downlink data notification response message by using the shared bearer includes: when the downlink data notification response message carries fast call instruction information, sending, by the user plane device, the downlink data to the access network device by using the shared bearer, where the fast call instruction information is used to instruct the user plane device to send the downlink data to the access network device by using the shared bearer.

Only when receiving the fast call instruction information sent by the control plane device, the user plane device sends the downlink data to the access network device by using the shared bearer. When not receiving the fast call instruction information sent by the control plane device, the user plane device may send the downlink data to the access network device in a manner in the prior art. To be specific, after operation S113 or operation S117 is performed, the user plane device sends the downlink data to the access network device by using a non-shared bearer.

Figure 8:
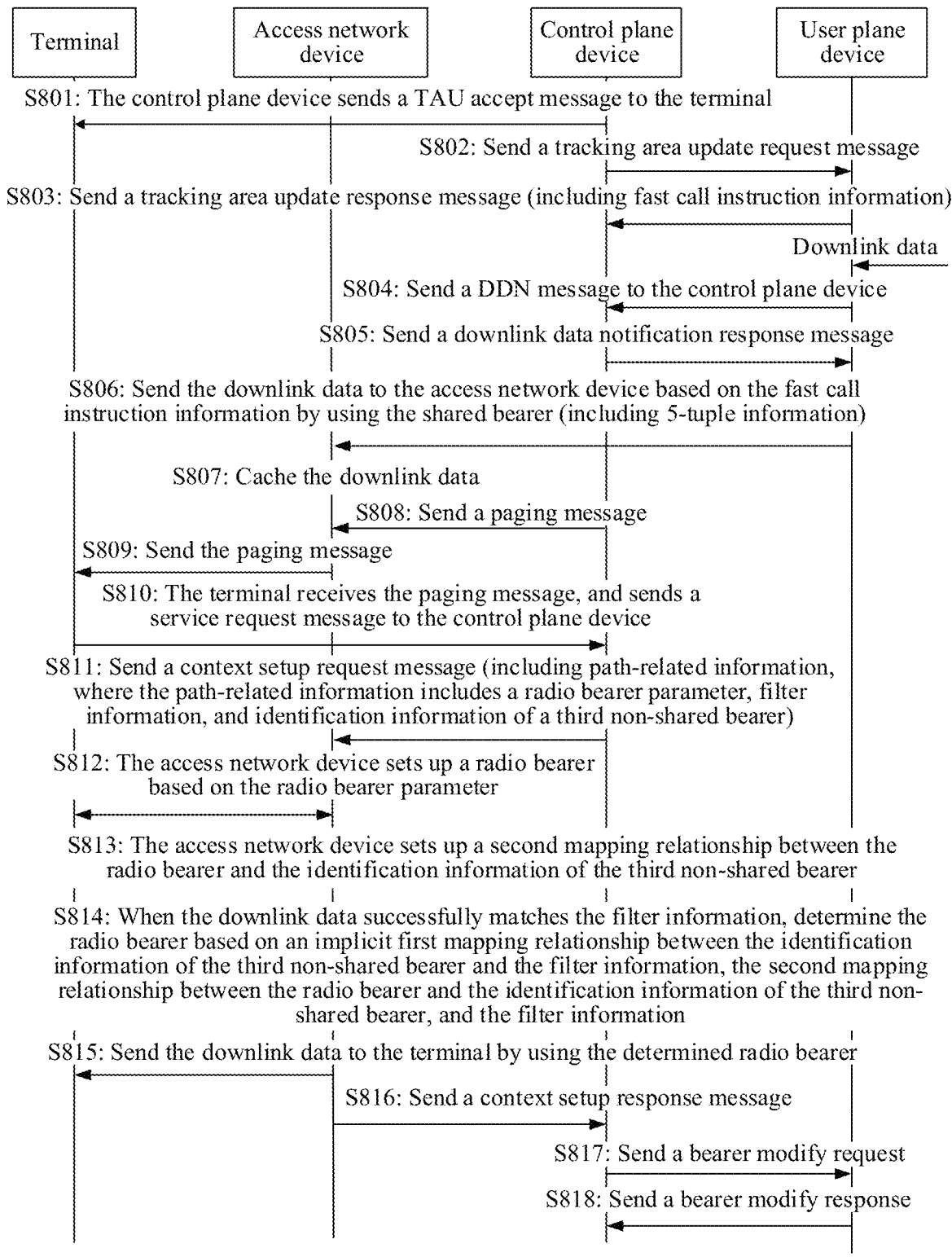
FIG. 8 is an interaction flowchart of a downlink data transmission method according to still another embodiment of this application.

That the fast call instruction information is applied to the embodiment corresponding to FIG. 7 is used as an example. Specifically, FIG. 8 is an interaction flowchart of an uplink data transmission method according to yet another embodiment of this application. As shown in FIG. 8, the method includes the following procedure:

Operation S801: A control plane device sends a TAU accept message to a terminal.

Operation S802: The control plane device sends a tracking area update request message to a user plane device.

The tracking area update request message may include a tracking area list (TA List) corresponding to the terminal.

Operation S803: The user plane device sends a tracking area update response message to the control plane device.

Operation S804: When receiving downlink data sent to the terminal in an idle mode, the user plane device sends a DDN message to the control plane device.

Operation S805: The control plane device sends a downlink data notification response message to the user plane device.

In one embodiment, the fast call instruction information may be carried in the downlink data notification response message sent by the control plane device to the user plane device, or may be carried in the tracking area update request message. This is not limited in this application.

Operation S806: The user plane device sends the downlink data to an access network device based on the fast call instruction information by using a shared bearer.

In an example, the user plane device may send the downlink data by using the shared bearer to all access network devices that are in the tracking area of the terminal.

The downlink data may include 5-tuple information.

Operation S807: The access network device caches the downlink data.

Operation S808: The control plane device sends a paging message to the access network device.

Operation S809: The access network device sends the paging message to the terminal.

Operation S810: The terminal receives the paging message, and sends a service request message to the control plane device.

Operation S811: The control plane device sends a context setup request message to the access network device, to request the access network device to prepare context for the terminal.

The context setup request message may include path-related information. The path-related information may include a radio bearer parameter, filter information, and identification information of a third non-shared bearer.

Operation S812: The access network device sets up a radio bearer based on the radio bearer parameter.

Operation S813: The access network device sets up a second mapping relationship between the radio bearer and the identification information of the third non-shared bearer.

Operation S814: When the downlink data successfully matches the filter information, determine the radio bearer based on the implicit first mapping relationship between the identification information of the third non-shared bearer and the filter information, the second mapping relationship between the radio bearer and the identification information of the third non-shared bearer, and the filter information.

Operation S814 is the same as operation S714, and specific descriptions are not provided herein again.

Operation S815: The access network device sends the downlink data to the terminal by using the determined radio bearer.

Operation S816: The access network device sends a context setup response message to the control plane device.

Operation S817: The control plane device sends a bearer modify request to the user plane device.

Operation S818: The user plane device sends a bearer modify response to the control plane device.

Operation S817 and operation S818 are used to switch the downlink data from the shared bearer to the non-shared bearer.

Operation 801 is an optional operation, and this embodiment is only an example for description.

In one embodiment, only when receiving the fast call instruction information sent by the control plane device, the user plane device sends the downlink data to the access network device by using the shared bearer. Correspondingly, when not receiving the fast call instruction information sent by the control plane device, the user plane device may send the downlink data to the access network device in a manner in the prior art. In this way, downlink data sending flexibility is improved.

In one embodiment, the method further includes: receiving, by the user plane device, a paging message sent by the control plane device; and sending, by the user plane device, the paging message to the access network device, so that the access network device sends the paging message to the terminal.

In one embodiment, the user plane device may send the paging message while sending the downlink data to the access network device, that is, adds the paging message to a protocol header of the shared bearer used to encapsulate the downlink data.

In another embodiment, the user plane device may encapsulate the paging message in a protocol header of the shared bearer after sending the downlink data to the access network device, to send the paging message to the access network device. This is not limited in this application. The following uses an example in which the user plane device simultaneously sends the downlink data and the paging message.

Figure 9:
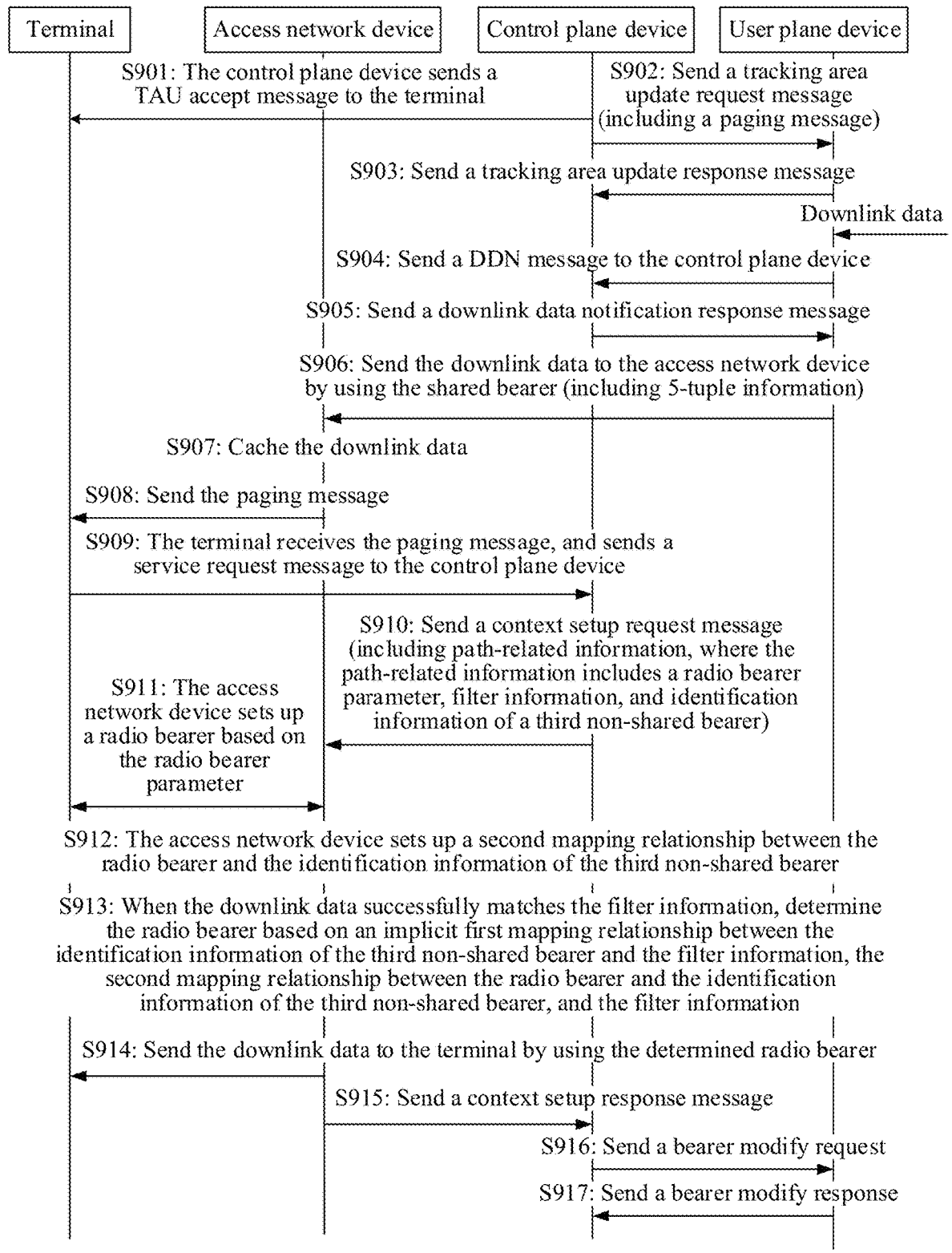
FIG. 9 is an interaction flowchart of a downlink data transmission method according to yet another embodiment of this application.

Specifically, an example in which the method is applied to the embodiment corresponding to FIG. 7 is used. Specifically, FIG. 9 is an interaction flowchart of a downlink data transmission method according to another embodiment of this application. As shown in FIG. 9, the method includes the following procedure:

Operation S901: A control plane device sends a TAU accept message to a terminal.

Operation S902: The control plane device sends a tracking area update request message to a user plane device.

The tracking area update request message may include a tracking area list (TA List) corresponding to the terminal and a paging message.

Operation S903: The user plane device sends a tracking area update response message to the control plane device.

Operation S904: When receiving downlink data sent to the terminal in an idle mode, the user plane device sends a DDN message to the control plane device.

Operation S905: The control plane device sends a downlink data notification response to the user plane device.

Operation S906: The user plane device sends the downlink data to the access network device by using the shared bearer while sending the paging message to the access network device by using the shared bearer.

In an example, the user plane device may send the downlink data by using the shared bearer to all access network devices that are in the tracking area of the terminal.

Operation S907: The access network device caches the downlink data.

Operation S908: The access network device sends the paging message to the terminal.

Operation S909: The terminal receives the paging message, and sends a service request message to the control plane device.

Operation S910: The control plane device sends a context setup request message to the access network device.

Operation S911: The access network device sets up a radio bearer based on the radio bearer parameter.

Operation S912: The access network device sets up a second mapping relationship between the radio bearer and the identification information of the third non-shared bearer.

Operation S913: When the downlink data successfully matches the filter information, determine the radio bearer based on the implicit first mapping relationship between the identification information of the third non-shared bearer and the filter information, the second mapping relationship between the radio bearer and the identification information of the third non-shared bearer, and the filter information.

Operation S913 is the same as operation S714, and specific descriptions are not provided herein again.

Operation S914: The access network device sends the downlink data to the terminal by using the determined radio bearer.

Operation S915: The access network device sends a context setup response message to the control plane device.

Operation S916: The control plane device sends a bearer modify request to the user plane device.

Operation S917: The user plane device sends a bearer modify response to the control plane device.

Operation 901 is an optional operation, and this embodiment is only an example for description.

In one embodiment, the control plane device first sends the paging message to the user plane device, where the paging message may be carried in a tracking area update request message. Then, the user plane device sends the paging message to the access network device while sending the downlink data to the access network device. Finally, the access network device sends the downlink data to the terminal. In this way, downlink data sending efficiency is improved.

Figure 10:
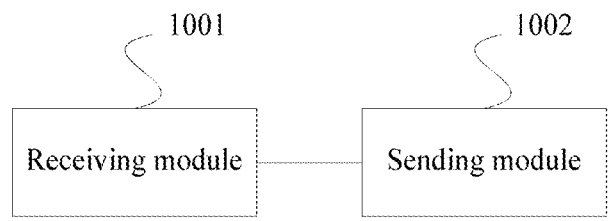
FIG. 10 is a schematic structural diagram of a downlink data transmission apparatus according to an embodiment of this application.

FIG. 10 is a schematic structural diagram of a downlink data transmission apparatus according to an embodiment of this application. The apparatus may be a user plane device. As shown in FIG. 10, the apparatus includes:

a receiving module 1001, configured to receive downlink data of a terminal, where the terminal is in an idle mode; and a sending module 1002, configured to send the downlink data by using a shared bearer to an access network device that is in a tracking area of the terminal.

In one embodiment, the sending module 1002 is further configured to send a downlink data notification message to a control plane device;

the receiving module 1001 is further configured to receive a downlink data notification response message sent by the control plane device; and the sending module 1002 is specifically configured to send the downlink data to the access network device based on the downlink data notification response message by using the shared bearer.

In one embodiment, the sending module 1002 is specifically configured to: when the downlink data notification response message carries fast call instruction information, send the downlink data to the access network device by using the shared bearer, where the fast call instruction information is used to instruct the sending module to send the downlink data to the access network device by using the shared bearer.

In one embodiment, the receiving module 1001 is further configured to receive a paging message sent by the control plane device; and the sending module 1002 is further configured to send the paging message to the access network device, so that the access network device sends the paging message to the terminal.

In one embodiment, the sending module 1002 is specifically configured to send the downlink data to the access network device in a multicast manner by using the shared bearer.

In one embodiment, the sending module 1002 is further configured to send identification information of a first non-shared bearer to the access network device by using the shared bearer, where the identification information of the first non-shared bearer is used to indicate a non-shared bearer used to transmit the downlink data between the user plane device and the access network device.

In one embodiment, the control plane device is an MME and the apparatus is an SGW; the control plane device and the apparatus are both SGSNs; or the control plane device is a session management functional entity and the apparatus is a user plane gateway functional entity.

The downlink data transmission apparatus provided in this embodiment of this application may be configured to perform the actions or the operations of the user plane device in the method embodiment. The implementation principles and the technical effects thereof are similar, and details are not described herein again.

Figure 11:
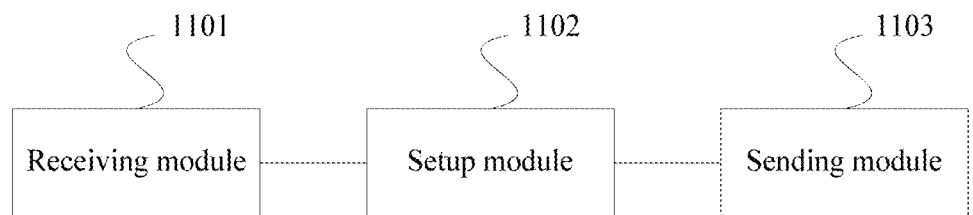
FIG. 11 is a schematic structural diagram of a downlink data transmission apparatus according to another embodiment of this application.

FIG. 11 is a schematic structural diagram of a downlink data transmission apparatus according to another embodiment of this application. The apparatus may be an access network device. As shown in FIG. 11, the apparatus includes:

a receiving module 1101, configured to: receive downlink data of a terminal that is sent by a user plane device by using a shared bearer; and receive a context setup request message sent by a control plane device, where the context setup request message carries path-related information of the terminal;

a setup module 1102, configured to set up a radio bearer between the access network device and the terminal based on the context setup request message; and a sending module 1103, configured to send the downlink data to the terminal by using the radio bearer.

In one embodiment, the receiving module 1101 is further configured to receive identification information of a first non-shared bearer that is sent by the user plane device by using the shared bearer, where the identification information of the first non-shared bearer is used to indicate a non-shared bearer used to transmit the downlink data between the user plane device and the access network device.

In one embodiment, the path-related information includes identification information of a second non-shared bearer and a radio bearer parameter. The setup module 1102 is specifically configured to: when the identification information of the first non-shared bearer and the identification information of the second non-shared bearer indicate a same non-shared bearer, set up the radio bearer between the access network device and the terminal based on the radio bearer parameter.

In one embodiment, the setup module 1102 is further configured to set up a mapping relationship between the radio bearer and the identification information of the first non-shared bearer.

In one embodiment, the path-related information includes a radio bearer parameter, filter information, and a first mapping relationship between the filter information and identification information of a third non-shared bearer. The setup module 1102 is specifically configured to set up the radio bearer between the access network device and the terminal based on the radio bearer parameter.

In one embodiment, the setup module 1102 is further configured to set up a second mapping relationship between the radio bearer and the identification information of the third non-shared bearer.

The sending module 1103 is specifically configured to: when the filter information successfully matches the downlink data, determine the radio bearer based on the filter information, the first mapping relationship, and the second mapping relationship; and send the downlink data by using the determined radio bearer.

In one embodiment, the receiving module 1101 is specifically configured to receive the downlink data sent by the user plane device in a multicast manner by using the shared bearer.

In one embodiment, the control plane device is an MME and the user plane device is an SGW; the control plane device and the user plane device are both SGSNs; or the control plane device is a session management functional entity and the user plane device is a user plane gateway functional entity.

The downlink data transmission apparatus provided in this embodiment of this application may be configured to perform the actions or the operations of the access network device in the method embodiment. The implementation principles and the technical effects thereof are similar, and details are not described herein again.

Figure 12:
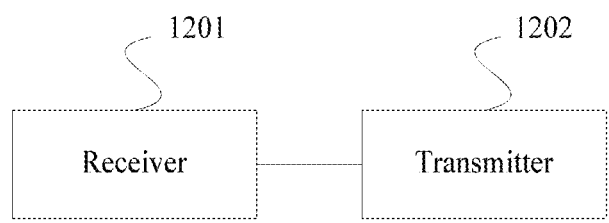
FIG. 12 is a schematic structural diagram of a downlink data transmission apparatus according to still another embodiment of this application.

FIG. 12 is a schematic structural diagram of a downlink data transmission apparatus according to still another embodiment of this application. The apparatus may be a user plane device. As shown in FIG. 12, the apparatus includes:

a receiver 1201, configured to receive downlink data of a terminal, where the terminal is in an idle mode; and a transmitter 1202, configured to send the downlink data by using a shared bearer to an access network device that is in a tracking area of the terminal.

In one embodiment, the transmitter 1202 is further configured to send a downlink data notification message to a control plane device;

the receiver 1201 is further configured to receive a downlink data notification response message sent by the control plane device; and the transmitter 1202 is specifically configured to send the downlink data to the access network device based on the downlink data notification response message by using the shared bearer.

In one embodiment, the transmitter 1202 is specifically configured to: when the downlink data notification response message carries fast call instruction information, send the downlink data to the access network device by using the shared bearer, where the fast call instruction information is used to instruct the sending module to send the downlink data to the access network device by using the shared bearer.

In one embodiment, the receiver 1201 is further configured to receive a paging message sent by the control plane device; and the transmitter 1202 is further configured to send the paging message to the access network device, so that the access network device sends the paging message to the terminal.

In one embodiment, the transmitter 1202 is specifically configured to send the downlink data to the access network device in a multicast manner by using the shared bearer.

In one embodiment, the transmitter 1202 is further configured to send identification information of a first non-shared bearer to the access network device by using the shared bearer, where the identification information of the first non-shared bearer is used to indicate a non-shared bearer used to transmit the downlink data between the user plane device and the access network device.

In one embodiment, the control plane device is an MME and the apparatus is an SGW; the control plane device and the apparatus are both SGSNs; or the control plane device is a session management functional entity and the apparatus is a user plane gateway functional entity.

The downlink data transmission apparatus provided in this embodiment of this application may be configured to perform the actions or the operations of the user plane device in the method embodiment. The implementation principles and the technical effects thereof are similar, and details are not described herein again.

Figure 13:
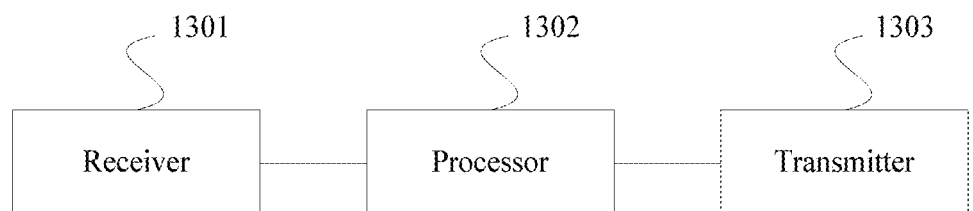
FIG. 13 is a schematic structural diagram of a downlink data transmission apparatus according to yet another embodiment of this application.

FIG. 13 is a schematic structural diagram of a downlink data transmission apparatus according to yet another embodiment of this application. The apparatus may be an access network device. As shown in FIG. 13, the apparatus includes:

a receiver 1301, configured to:

receive downlink data of a terminal that is sent by a user plane device by using a shared bearer; and receive a context setup request message sent by a control plane device, where the context setup request message carries path-related information of the terminal;

a processor 1302, configured to set up a radio bearer between the access network device and the terminal based on the context setup request message; and a transmitter 1303, configured to send the downlink data to the terminal by using the radio bearer.

In one embodiment, the receiver 1301 is further configured to receive identification information of a first non-shared bearer that is sent by the user plane device by using the shared bearer, where the identification information of the first non-shared bearer is used to indicate a non-shared bearer used to transmit the downlink data between the user plane device and the access network device.

In one embodiment, the path-related information includes identification information of a second non-shared bearer and a radio bearer parameter. The processor 1302 is specifically configured to: when the identification information of the first non-shared bearer and the identification information of the second non-shared bearer indicate a same non-shared bearer, set up the radio bearer between the access network device and the terminal based on the radio bearer parameter.

In one embodiment, the processor 1302 is further configured to set up a mapping relationship between the radio bearer and the identification information of the first non-shared bearer.

In one embodiment, the path-related information includes a radio bearer parameter, filter information, and a first mapping relationship between the filter information and identification information of a third non-shared bearer. The processor 1302 is specifically configured to set up the radio bearer between the access network device and the terminal based on the radio bearer parameter.

In one embodiment, the processor 1302 is further configured to set up a second mapping relationship between the radio bearer and the identification information of the third non-shared bearer.

The transmitter 1303 is configured to: when the filter information successfully matches the downlink data, determine the radio bearer based on the filter information, the first mapping relationship, and the second mapping relationship; and send the downlink data by using the determined radio bearer.

In one embodiment, the receiver 1301 is specifically configured to receive the downlink data sent by the user plane device in a multicast manner by using the shared bearer.

In one embodiment, the control plane device is an MME and the user plane device is an SGW; the control plane device and the user plane device are both SGSNs; or the control plane device is a session management functional entity and the user plane device is a user plane gateway functional entity.

The downlink data transmission apparatus provided in this embodiment of this application may be configured to perform the actions or the operations of the access network device in the method embodiment. The implementation principles and the technical effects thereof are similar, and details are not described herein again.

Another embodiment of this application further provides a downlink data transmission system. The system may include an access network device and a user plane device. The access network device may be configured to perform the actions or the operations of the access network device in the method embodiment, and the user plane device may be configured to perform the actions or the operations of the user plane device in the method embodiment.

A person of ordinary skill in the art may understand that some or all of the operations of the method embodiments may be implemented by a program instructing relevant hardware. The program may be stored in a computer-readable storage medium. When the program runs, the operations of the method embodiments are performed. The storage medium includes various media that can store program code, such as a ROM, a RAM, a magnetic disk, or an optical disc, and the like.

What is claimed is:

1. A downlink data transmission method, comprising:
receiving, by a user plane device, downlink data of a terminal, wherein the terminal is in an idle mode;
sending, by the user plane device, the downlink data by using a shared bearer to an access network device that is in a tracking area of the terminal and sending, by the user plane device, identification information of a first non-shared bearer to the access network device by using the shared bearer, wherein the identification information of the first non-shared bearer is used to indicate a non-shared bearer used to transmit the downlink data between the user plane device and the access network device;
receiving, by the access network device, the downlink data;
receiving, by the access network device, a context setup request message from a control plane device, wherein the context setup request message carries path-related information of the terminal;
setting up, by the access network device, a radio bearer between the access network device and the terminal based on the context setup request message; and sending, by the access network device, the downlink data to the terminal by using the radio bearer.

2. The method according to claim 1, wherein the sending, by the user plane device, the downlink data by using a shared bearer to an access network device that is in a tracking area of the terminal comprises:
   sending, by the user plane device, a downlink data notification message to the control plane device;
   receiving, by the user plane device, a downlink data notification response message sent by the control plane device; and
   sending, by the user plane device, the downlink data to the access network device based on the downlink data notification response message by using the shared bearer.

3. The method according to claim 2, wherein the sending, by the user plane device, the downlink data to the access network device based on the downlink data notification response message by using the shared bearer comprises:
   when the downlink data notification response message carries fast call instruction information, sending, by the user plane device, the downlink data to the access network device by using the shared bearer, wherein the fast call instruction information is used to instruct the user plane device to send the downlink data to the access network device by using the shared bearer.

4. The method according to claim 1, further comprising:
   receiving, by the user plane device, a paging message from the control plane device;
   sending, by the user plane device, the paging message to the access network device; and
   sending, by the access network device, the paging message to the terminal.

5. The method according to claim 1, wherein the sending, by the user plane device, the downlink data by using a shared bearer to an access network device that is in a tracking area of the terminal comprises:
   sending, by the user plane device, the downlink data to the access network device in a multicast manner by using the shared bearer.

6. The method according to claim 1, wherein the path-related information comprises identification information of a second non-shared bearer and a radio bearer parameter; and the setting up, by the access network device, a radio bearer between the access network device and the terminal based on the context setup request message comprises:
   when the identification information of the first non-shared bearer and the identification information of the second non-shared bearer indicate a same non-shared bearer, setting up, by the access network device, the radio bearer between the access network device and the terminal based on the radio bearer parameter.

7. A downlink data transmission method, comprising:
   receiving, by an access network device, downlink data of a terminal that is sent by a user plane device by using a shared bearer and receiving, by the access network device, identification information of a first non-shared bearer that is sent by the user plane device by using the shared bearer, wherein the identification information of the first non-shared bearer is used to indicate a non-shared bearer used to transmit the downlink data between the user plane device and the access network device;
   receiving, by the access network device, a context setup request message from a control plane device, wherein the context setup request message carries path-related information of the terminal;
   setting up, by the access network device, a radio bearer between the access network device and the terminal based on the context setup request message; and
   sending, by the access network device, the downlink data to the terminal by using the radio bearer.

8. The method according to claim 7, wherein the path-related information comprises identification information of a second non-shared bearer and a radio bearer parameter; and the setting up, by the access network device, a radio bearer between the access network device and the terminal based on the context setup request message comprises:
   when the identification information of the first non-shared bearer and the identification information of the second non-shared bearer indicate a same non-shared bearer, setting up, by the access network device, the radio bearer between the access network device and the terminal based on the radio bearer parameter.

9. The method according to claim 7, wherein the path-related information comprises a radio bearer parameter, filter information, and a first mapping relationship between the filter information and identification information of a third non-shared bearer; and
   the setting up, by the access network device, a radio bearer between the access network device and the terminal based on the context setup request message comprises:
   setting up, by the access network device, the radio bearer between the access network device and the terminal based on the radio bearer parameter.

10. The method according to claim 9, further comprising: setting up, by the access network device, a second mapping relationship between the radio bearer and the identification information of the third non-shared bearer; and
   the sending, by the access network device, the downlink data to the terminal by using the radio bearer comprises:
   when the filter information successfully matches the downlink data, determining, by the access network device, the radio bearer based on the filter information, the first mapping relationship, and the second mapping relationship; and
   sending, by the access network device, the downlink data by using the determined radio bearer.

11. The method according to claim 7, wherein
   the control plane device is a mobility management entity, and the user plane device is a serving gateway;
   the control plane device and the user plane device are both serving general packet radio service support nodes; or
   the control plane device is a session management functional entity, and the user plane device is a user plane gateway functional entity.

12. A downlink data transmission apparatus, comprising: at least one processor, a memory and a communications interface; wherein
   the memory configured to store a program; and
   the at least one processor configured to execute the program stored in the memory to implement the following operations:
   receiving downlink data of a terminal that is sent by a user plane device by using a shared bearer and receiving identification information of a first non-shared bearer that is sent by the user plane device by using the shared bearer, wherein the identification information of the first non-shared bearer is used to indicate a non-shared bearer used to transmit the downlink data between the user plane device and the apparatus;

receiving a context setup request message from a control plane device, wherein the context setup request message carries path-related information of the terminal;

setting up a radio bearer between the apparatus and the terminal based on the context setup request message; and sending the downlink data to the terminal by using the radio bearer.

13. The apparatus according to claim 12, wherein the path-related information comprises identification information of a second non-shared bearer and a radio bearer parameter; and the operations further comprise:

when the identification information of the first non-shared bearer and the identification information of the second non-shared bearer indicate a same non-shared bearer, setting up the radio bearer between the apparatus and the terminal based on the radio bearer parameter.

14. The apparatus according to claim 12, wherein the path-related information comprises a radio bearer parameter, filter information, and a first mapping relationship between the filter information and identification information of a third non-shared bearer; and the operations further comprise:

setting up the radio bearer between the apparatus and the terminal based on the radio bearer parameter.

15. The apparatus according to claim 14, wherein the operations further comprise:

setting up a second mapping relationship between the radio bearer and the identification information of the third non-shared bearer;

when the filter information successfully matches the downlink data, determining the radio bearer based on the filter information, the first mapping relationship, and the second mapping relationship; and sending the downlink data by using the determined radio bearer.

16. The apparatus according to claim 12, wherein the operations further comprise:

receiving the downlink data sent by the user plane device in a multicast manner by using the shared bearer.

17. The apparatus according to claim 12, wherein the control plane device is a mobility management entity, and the user plane device is a serving gateway;

the control plane device and the user plane device are both serving general packet radio service support nodes; or the control plane device is a session management functional entity, and the user plane device is a user plane gateway functional entity.

* * * * *